United States Patent [19]
Osterfeld et al.

[11] Patent Number: 6,094,159
[45] Date of Patent: Jul. 25, 2000

[54] PROCESS FOR MEASURING DISTANCE WITH ADAPTIVE AMPLIFICATION

[75] Inventors: Martin Osterfeld, Bietigheim-Bissingen; Werner Philipps, Ludwigsburg; Anton Grabmaier, Bietigheim-Bissingen; Timo Brandt, Neckarsulm; Jürgen Benz, Besigheim, all of Germany

[73] Assignee: ITT Manufacturing Enterprises, Inc., Wilmington, Del.

[21] Appl. No.: 09/244,744

[22] Filed: Feb. 5, 1999

[30] Foreign Application Priority Data

Feb. 7, 1998 [DE] Germany ............... 198 04 957

[51] Int. Cl.[7] ............................................. G01S 7/34
[52] U.S. Cl. .................. 342/70; 342/73; 342/85; 342/91; 342/92
[58] Field of Search ............... 342/70, 71, 72, 342/73, 82, 85, 87, 89, 91, 92, 118, 135

[56] References Cited

U.S. PATENT DOCUMENTS

| | | | |
|---|---|---|---|
| 3,719,942 | 3/1973 | Herman et al. | 342/92 |
| 4,435,707 | 3/1984 | Clark | 342/26 |
| 4,509,050 | 4/1985 | Amoroso et al. | 342/91 |
| 4,792,804 | 12/1988 | Rubechini | 342/27 |
| 5,440,310 | 8/1995 | Schreiner | 342/124 |
| 5,485,155 | 1/1996 | Hibino | 342/70 |
| 5,654,715 | 8/1997 | Hayashikura et al. | |

FOREIGN PATENT DOCUMENTS

| | | |
|---|---|---|
| 32 09 399 | 9/1983 | Germany. |
| 3209399A1 | 9/1983 | Germany ............ G01S 7/02 |
| 32 44 358 | 6/1984 | Germany. |
| 37 79 683 | 9/1987 | Germany. |
| 40 32 713 | 4/1991 | Germany. |
| 196 24 614 | 1/1998 | Germany. |
| 832508B | 5/1981 | U.S.S.R. ............ G01S 7/36 |

OTHER PUBLICATIONS

Otto Follinger, Regelungstechnik, Huthig Buch Verlag, Heidelberg, vol. 6, pp. 10–19.

Patent Abstract of Japan; JP 6–174832 A, P–1804, Sep. 26, 1994.

*Primary Examiner*—John B. Sotomayor
*Attorney, Agent, or Firm*—J. Gordon Lewis

[57] ABSTRACT

A process for determining the distance between a distance sensor and an object, wherein an analog input signal is directed to a transmitter of the distance sensor. The transmitter emits a wave which is reflected by the object. A receiver of the distance sensor receives the reflected wave and thereupon emits an analog output signal whose level is dependent upon the distance and/or the type of object. The output signal is amplified by a subsequently added amplifier. The amplifier signal is directed to an analog/digital converter and is converted into a digital signal. The digital signal is directed to an evaluation circuit for the computation of a distance value. The signal amplification of the amplifier is controlled in an adaptively dependent manner on the level of the output signal and/or in a manner dependent on the signal value of an amplification signal made available by the evaluation circuit which is characteristic of an anticipated distance range.

14 Claims, 2 Drawing Sheets

PROCESS FOR MEASURING DISTANCE WITH ADAPTIVE AMPLIFICATION

The invention relates to a process or a device for determining the distance between a distance sensor and an object. Furthermore, the present invention relates to a process for producing user information that enables the driver of a motor vehicle to assess, in a manner adapted to the situation, the configuration of an obstacle.

In many areas of technology, distances must be determined. In motor vehicle technology, for example, it is already known to use distance measuring systems to aid the driver while he is entering and leaving a parking space. These systems are based mostly on the ultrasound principle, wherein the sensor heads are integrated, depending on the layout, in the rear bumper or in both bumpers. Furthermore, distance measuring systems have already been proposed which make it possible for the driver to monitor, while driving, the distance from the vehicle in front. These distance measuring systems must be able to measure substantially greater distances than the previously addressed parking aids.

One pump of the present invention is to indicate a distance determining process that has a high degree of measuring precision at close range and simultaneously encompasses a large measuring range. Furthermore, one purpose of the present invention is to create a device for determining the distance that has a high degree of measuring precision at close range, has a large measuring range and simultaneously can be manufactured in a cost-efficient manner.

Due to the adaptive control of the signal amplification that is dependent on the level of the output signal and/or is dependent on the signal value of an amplification command signal that is provided by the evaluation circuit, the dynamic output voltage range of the amplifier is adapted in an optimum manner to the transfer characteristic of the subsequently added analog/digital converter. Thereby, the quantization error is minimized that occurs unquestionably as a result of the system-related limited resolution of the analog/digital converter during the conversion of the amplified analog signal into a number with a finite number of bits. This makes it possible, on one hand, to achieve a high degree of measuring precision in the case of small distances and, on the other hand, to also use the process for the measurement of great distances.

This can be understood in the following manner. The reflected wave has an amplitude height which is dependent upon the distance of the object as well as on the type of object, for example, its spatial extent, reflectivity, etc. When small distances or large objects are measured, the reflected wave has, as a rule, very high amplitude values. The analog output signal emitted by the receiver then also shows a very high level value. If this level value were to be amplified by an amplifier with a constant amplification, i.e., an amplification independent of the level, this would necessitate an analog/digital converter which could still convert the amplified, high level value. Therefore, such an analog/digital converter must have a very wide dynamic range. However, since the quantization noise of an analog/digital converter with constant resolution (N-bit converter, N=constant) rises with increasing dynamic range, a lesser measuring precision should be taken into consideration in this case. Alternatively, it would be possible to use an analog/digital converter with a higher resolution (M-bit converter, M>N), whereby it would be possible to increase the measuring precision while, however, the component costs will increase. By means of the adaptive amplification of the output signal found with the present invention, it is possible, in the case of a high amplitude value of the reflected wave, to effect a suitable, low amplification by means of the amplifier, whereby an analog/digital converter with a limited dynamic range and thus, in the case of a fixed resolution, increased signal sensitivity, can be used. The process of the invention thus makes possible a distance measurement with a high degree of sensitivity, as required in the case of distance measuring systems used in motor vehicles, particularly at close range.

On the other hand, with the measurements of great distances, relatively small amplitudes of the reflected wave are to be expected. The adaptive amplification of the invention produces in this case a comparatively strong signal amplification and thereby prevents the amplified signal from dropping below the detection threshold of the analog/digital converter. Consequently, also great distances can be measured safely, i.e., a large measuring range is obtained.

According to a preferred embodiment of the process of the invention, the input signal is a pulse signal and the distance determination takes place according to a pulse duration process. Such a process is particularly suited during the use of a radar sensor as a distance sensor. The use of a pulse duration process characterizes itself as an advantageous distance gauging process in that the signal value of the amplification command signal, upon the appearance of a pulse, respectively, rises in the input signal until the next pulse appears in the input signal. Thereby, it is possible to amplify waves, reflected by distant objects and arriving at a later time, with a higher amplification and thereby the measuring range can be increased to greater distances.

When a pulse duration process is used, it is also advantageous when the time span between the appearance of two pulses is divided into a sequence of time windows and to each time window a predetermined signal value of the amplification command signal is assigned. While the measuring range can be influenced by predetermining the individual signal values with respect to the time windows, it is possible by predetermining the duration of the individual windows between two pulses to determine the measuring precision. Since in the case of greater distances a smaller measuring precision suffices than with smaller distances, the duration of a window occurring at a later time is preferably selected greater than the duration of a previously appearing time window between two pulses.

The distance measuring process of the invention, due to its large measuring range, is particularly suited for use in a process for producing user information that aids a motor vehicle driver during a mode of responding in street traffic that is adapted to the situation.

With such a process, the driving information data advantageously comprise at least steering angle data and driving speed data.

According to an advantageous embodiment of this process, the object information data are subjected to a plausibility test via the second program routine, either prior to or during the further processing. For example, the plausibility test may consist in that object information data corresponding to suddenly appearing or also suddenly disappearing obstacles are rejected, since in reality such situations do not arise. By means of this step, driving safety can be further increased during practical operation.

According to an additional advantageous modification, the second program routine comprises an evaluation routine that evaluates by means of the object data and the driving data the likelihood of danger posed by a detected obstacle, wherein a warning signal is emitted when the determined danger likelihood value exceeds a predetermined reference value. In this way, previously defined, particularly grave situations of danger can be pointed out to the user by the emission of the warning signal.

By the provision of an amplifier with an adaptive signal amplification, the use of an analog/digital converter whose acquisition is cost-efficient is made possible because a high-resolution analog/digital converter as already described is not required.

When the amplifier is integrated in the sensor, this allows the preparation of a low-resistance output signal, whereby in an advantageous manner a greater insensitivity of the device with respect to interferences is achieved during the transfer along longer conduction paths.

A particularly simple embodiment of the amplifier with adaptive signal amplification is characterized in that the amplifier is formed from a logarithmic amplifier on the input side and a subsequently added amplifier phase with constant amplification.

In an alternative manner, a level detector may be arranged before the amplifier that detects the level of the output signal and prepares a level signal that is then directed to a control input for the signal amplification of the amplifier.

BRIEF DESCRIPTION OF THE DRAWING

In the subsequent text, the invention is described in greater detail as an example with reference to a drawing. Shown are.

DESCRIPTION OF THE PREFERRED EMBODIMENT

Figure 1:
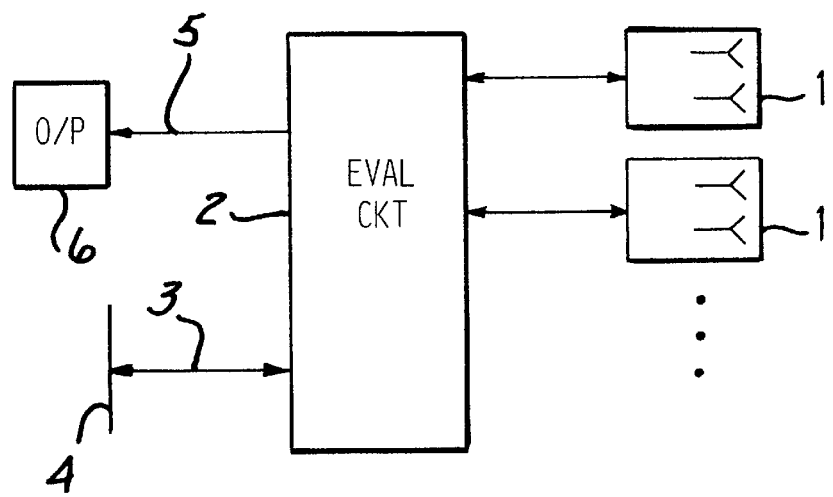
FIG. 1, which shows a basic diagram of a system for the perception of the environment with several distance sensors as used in a motor vehicle.

According to FIG. 1, a system for the perception of the environment consists of a multitude of radar sensors (1), preferably integrated in the bumper, which are in two way line connection with an evaluation circuit (2). The evaluation circuit (2) is connected via a line connection (3) with a bus system (4) of the vehicle, and a data output line (5) of the evaluation circuit (2) transfers audiovisual information data to the output unit (6) which, in a manner not shown, includes at least one display and one loudspeaker.

Figure 2:
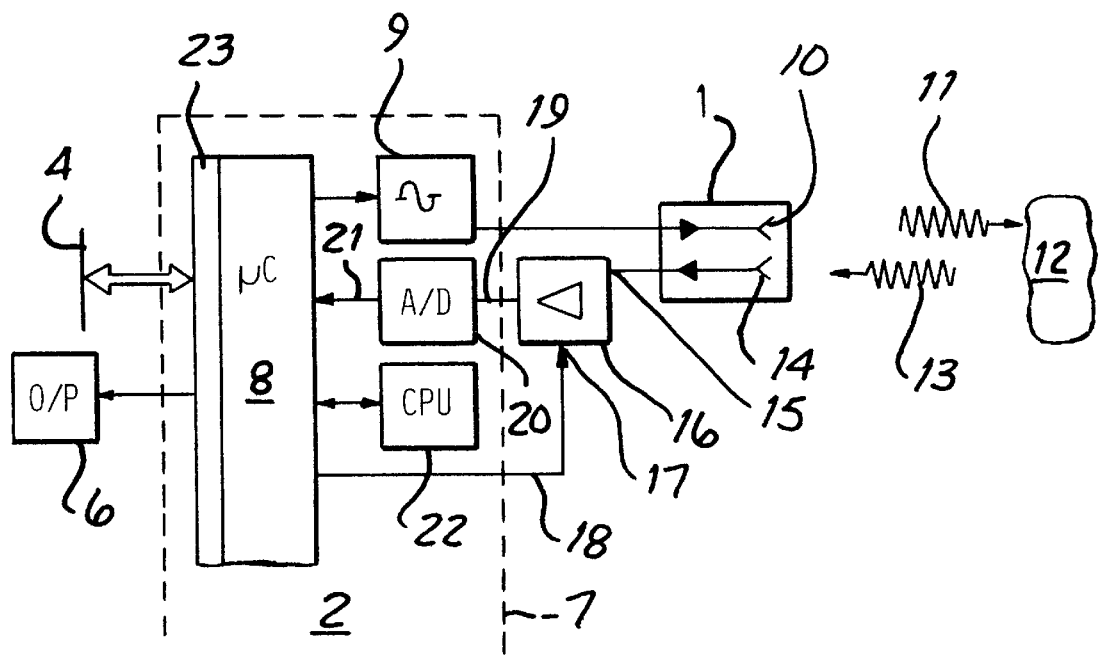
FIG. 2, which shows a schematic block diagram of the evaluation circuit shown in FIG. 1 with respect to a single distance sensor.

FIG. 2 shows a block diagram of the circuit assembly of the evaluation circuit (2) with respect to an individual radar distance sensor (1). There, the broken line (7) gathers the circuit elements forming the evaluation circuit (2).

The evaluation circuit (2) has a pulse generator (9) controlled by a microcontroller (8) which produces sinusoidal current pulse signals at regular intervals and directs these to a radar transmitter (10) of the radar distance sensor (1). Simultaneously, a counter, not shown in FIG. 2, is tripped. The radar transmitter (10) emits upon each incoming current pulse an electromagnetic wave packet (11) that spreads out in a defined direction away from the motor vehicle. The frequency of the wave packet lies in the micro- or millimeter wave range. If the wave packet (11) impacts, as shown in FIG. 2, with an object (12), it is reflected more or less strongly, depending on the size and material of the object (12). The reflected wave packet is identified in FIG. 2 with the reference symbol (13) and is picked up by a receiver (14) of the radar distance sensor (1). At that time, the total duration of the wave packets (11 and 13) is proportional to the distance between the radar distance sensor (1) and object (12).

The receiver (14) converts the wave packet (13) into an output signal (15) which essentially has a sinusoidal shape. The amplitude of the output signal depends on the amplitude of the incoming wave packet (13) and thus depends in an equally sensitive manner on the distance, the size and the reflectivity of the object (12). The output signal (15) is directed to an amplifier (16) that has an input (17) that can adjust the amplification of the amplifier (16). The input (17) is connected via a control line (18) with the microcontroller (8) and is charged with an amplification command signal emitted by same and explained in greater detail in the following text.

The amplified signal (19) is directed to an N-bit-analog/digital converter and from same is continuously converted into a binary number. The quantization error, which inevitably arises at this time, is smaller the greater the solution of the resolution (N) of the converter is, and the smaller the maximum input voltage of the converter is during the sinusoidal full-scale range, i.e., the dynamic range of the converter. The digital signal (21) produced by the analog/digital converter (20) is directed to the microcontroller (8).

With the arrival of the digital signal (21) at the microcontroller (8), the counter, not shown, is stopped and the value is directed to a microprocessor (22). From the value, the microprocessor (22) computes the distance between the radar distance sensor (1) and the object (12) and returns same to the microcontroller (8). The output of the distance value to the output unit (6) then takes place via an interface (23) of the microcontroller.

The amplification control through the amplification command signal takes place in the following manner: Directly after the transmission of an outgoing wave packet (11), at first a very slight amplification is set. If, shortly thereafter, an incoming wave packet (13) is registered, then the reflected object must be in the near field of the radar distance sensor (1). Due to the slight amplification, the high signal amplitude expected in this case is compensated for and thus it is possible to use a cost-efficient analog/digital converter with a limited dynamic range with a continuous lapse of time, the amplification of the amplifier (16) is then increased, so that even for great distances a signal amplitude is obtained that does not get lost in the quantization noise. This increases the distance measuring range of the system without the need for a high-resolution M-bit-analog/digital converter with M>N.

The amplification command signal may be selected in such a way that, between two pulses, a constantly increasing amplification is brought about within the amplifier (16). On the other hand, it is also possible to divide the time interval between two pulses into a sequence of time windows and to assign to each of these time windows a certain amplification value. The increase in the amplification then takes place in discrete steps during the transition from one time window to the next.

According to the representation in FIG. 1, additional radar distance sensors may be connected to the microcontroller (8) and may be controlled by same in a similar manner.

Figure 3:
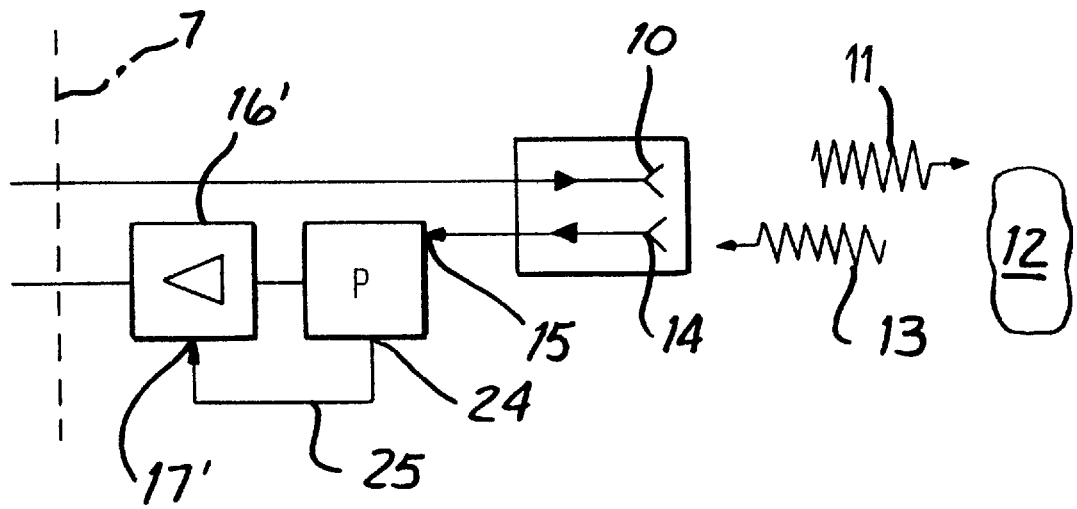
FIG. 3, which shows a modification of the circuit shown in FIG. 2.

FIG. 3 shows an alternative possibility for the adaptive amplification adjustment according to the present invention, wherein the broken line (7) represents the system boundary of the evaluation circuit (2).

The circuit according to FIG. 3 distinguishes itself from the structure shown in FIG. 2 in that a level detector (24) is added to the output of the radar receiver (14). The level detector (24) determines the amplitude of the output signal (15) and is connected via a line (25) in negative feedback with the amplification control input (17') of the amplifier (16'). The negative feedback control takes place in such a way that the greater the signal level determined by the level detector (24), the smaller the amplification is set.

A deviation from the arrangement shown in FIG. 3 consists of the level value determined by the level detector (24) being made available to the microprocessor (8), whereupon same adjusts the amplification of the amplifier (16) in a manner similar to the one in FIG. 2 via the output of a suitable amplification command signal.

A particularly simple, adaptive amplification control results when the amplifier consists of an amplification phase with a constant amplification and of a logarithmic amplifier connected before the amplifier.

The examples shown in FIGS. 2 and 3 have in common that the input of the analog/digital converter is controlled in the best possible manner, independently of the output signal (15) of the sensor. For this purpose, the analog/digital converter (20) may also be integrated in the microcontroller (8).

The circuit arrangement shown in FIG. 3 may be used even when the distance determination is not based on an operating time process.

Figure 4:
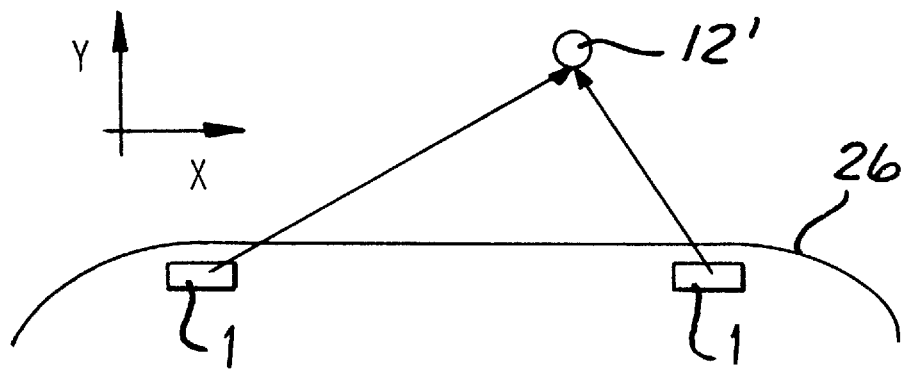
FIG. 4, which shows a representation for the purpose of explaining the process for the production of user information for the motor vehicle user.

With the aid of FIG. 4, while referring to the preceding FIGS. 1 and 3, a process for the generation of user information is explained that allows a motor vehicle driver to assess the obstacle structure in a manner adapted to the situation. FIG. 4 shows the front or what could also be the rear bumper (26) of a motor vehicle, not shown in greater detail, into which two distance sensors are integrated. The distance sensors may be any type of sensor, but the example shown here is based on distance sensors (1) that operate according to the radar principle. The distance sensors (1), respectively, scan an environment that extends spatially horizontally (x-direction) and vertically (y-direction), and in this way, pick up an object (12'). The respective distance values are determined according to the preceding description during each scan and thus are available to the evaluation circuit (2). Simultaneously, via the bus system (4), data which are relevant to the driving situation, such as the current steering angle and the current vehicle speed, are required by the microcontroller (8). The continuously determined distance values, as well as the driving information data, are made available to the microprocessor (22) and are processed by same in the following manner.

According to a first program routine, the microprocessor (22) continuously determines from the measured distance values the positions of the object(s) (12') detected and in the case of spatially extending objects, also data regarding the outer form of the object(s). By using a multitude of distance sensors (1) behind, in front of and possibly also lateral with respect to the motor vehicle, an obstacle scenario that mimics reality can be computed and constantly updated in this way.

The first program routine for determining the obstacle scenario comprises algorithms, such as a digital filtering, an averaging of several data sets, a correlation, Fourier analysis, etc.

The evaluation of the actual obstacle scenario with respect to the actual driving situation takes place in an additional step while taking into consideration the equally constantly updated driving data. Such an evaluation is necessary because a certain obstacle scenario, depending on the actual driving situation, may have an entirely different likelihood of danger for the driver. For this reason, in this second phase, for example, a predetermined movement trajectory of the motor vehicle is computed from the steering angle data and this is compared with the previously computed obstacle scenario while taking into consideration the speed data. For example, in this way, it can be determined whether the vehicle, when the speed is kept constant and the steering angle remains unchanged, will or will not scrape an obstacle during parking. This information is given to the driver as user information via the output unit (6) in the form of visual information or in the form of audio information.

Furthermore, the user information computed in the second phase may also be used for the constant monitoring of the ride with respect to predefined danger situations. In this case, the user information is passed on to the driver only when an actually dangerous situation occurs. This can be achieved because the microprocessor (22) constantly computes a danger likelihood value within the framework of the second computation routine and compares same with a predetermined reference value. If the danger likelihood value exceeds the predetermined reference value, the driver is informed of this fact by means of an audible or optical warning signal.

For example, the distance from the vehicle in front is constantly determined by means of the distance sensors (1) during normal driving. The speed data are then numerically divided by the measured distance data or connected through another suitable correlation. The value obtained at that time is the danger likelihood value and is compared with a previously entered reference value that represents a critical threshold for a vehicle following too closely. When a vehicle follows too closely or drives too fast, the warning occurs.

In addition to the already addressed areas of application as a parking aid and a distance monitoring system, the process of the invention can also be used, due to its described advantages, for the purpose of a warning of an obstacle that was overlooked by the driver ("Blind Spot Detection") for the early recognition of an accident ("Pre-crash Detection") and as an aid during driving in heavy traffic ("Stop and Go Distance Measurement").

We claim:

1. A process for determining the distance between a distance sensor and an object, wherein an analog input signal is directed to a transmitter of the distance sensor, the transmitter emits a wave that is reflected by the object, a receiver of the distance sensor receives the reflected wave and thereupon emits an analog output signal whose level depends on the distance and/or the type of the object, the output signal is amplified by a subsequently added amplifier, the amplified signal is directed to an analog/digital converter and is converted by same into a digital signal, and the digital signal for computing a distance value is directed to an evaluation circuit, characterized by the steps of controlling the signal amplification of the amplifier in an adaptive manner depending on one of the level of the output signal and the signal value of an amplification command signal made available by the evaluation circuit, which is characteristic of an expected distance range.

2. The process, according to claim 1, characterized in that the input signal is a pulse signal and the distance determination takes place according to a pulse duration process.

3. The process, according to claim 2, characterized in that the signal value of the amplification command signal increases upon each appearance of a pulse in the input signal up to the appearance of the next pulse in the input signal.

4. The process, according to claim 3, characterized in that the time span between the occurrence of two pulses is divided into a sequence of time windows and in that to each time window, a predetermined signal value of the amplification command signal is assigned.

5. The process, according to claim 4, characterized in that the time windows between two pulses have a variable duration, wherein the duration of a time window occurring later is greater than the duration of a time window occurring earlier.

6. A process for producing user information that enables a motor vehicle driver to evaluate an obstacle structure in a manner adapted to the situation while taking into consideration at least two distance values determined with respect to at least two different distance sensors according to one of the distance values determined according to one of the preceding claims, characterized by the steps of: constantly directing the two determined distance values to a computing unit, determining by the computing unit object data from the two distance values via one of the spatial position and the form of an obstacle according to a first program routines; and processing the object data into user data according to a second program routine, while taking into consideration driving data that are characteristic of the actual driving condition of the vehicle, and in that the user data are given to the vehicle driver.

7. The process, according to claim 6, characterized in that the driving data contain at least steering angle data and driving speed data.

8. The process, according to claim 6, characterized in that the object data are subjected before or during further processing to a plausibility test by means of the second program routine.

9. The process, according to claim 6, characterized in that the second program routine comprises an evaluation routine that evaluates the danger likelihood of a detected obstacle, and in that a warning signal is emitted when the detected danger likelihood value exceeds a predetermined reference value.

10. A device for determining a distance between a distance sensor and an object with a transmitter to which an analog input signal is directed and that emits a wave that is reflected by the object, a receiver that receives the reflected wave and subsequently emits an analog output signal whose level is dependent upon the distance and/or the type of the object, an amplifier that amplifies the output signal, an analog/digital converter that converts the amplified signal into a digital signal and an evaluation circuit to which the digital signal is directed for the purpose of computing the distance values, characterized in that the amplifier is an amplifier with a variable signal amplification and in that the signal amplification is regulated dependent upon the level of the output signal and/or dependent on the signal value of an amplification command signal made available by the evaluation circuit, which is characteristic for an anticipated distance range.

11. The device, according to claim 10, characterized in that the transmitter is a radar transmitter.

12. The device, according to claim 10, characterized in that the amplifier is integrated into the distance sensor.

13. The device, according to claim 10, characterized in that the amplifier is formed from a logarithmic amplifier, provided on the input side, and an amplification phase with constant amplification on the output side.

14. The device, according to claim 10, characterized by a level detector, provided before the amplifier, that detects the level of the output signal and makes available a level signal that is directed in a negative feedback circuit to a control input for the signal amplification of the amplifier.

* * * * *